3,732,216
3-HETEROARYL-2-THIO-1,3-THIAZANE-2,4-DIONES
Joseph Weinstock, Phoenixville, Pa., assignor to Smith Kline & French Laboratories, Philadelphia, Pa.
No Drawing. Filed Nov. 17, 1971, Ser. No. 199,768
Int. Cl. C07d 93/06
U.S. Cl. 260—243 R     4 Claims

ABSTRACT OF THE DISCLOSURE

3 - heteroaryl - 2-thio-1,3-thiazane-2,4-diones in which the heteroaryl moiety is pyridyl, thiazolyl, thienyl, furyl, pyridazinyl, thiadiazolyl, pyrimidyl or triazinyl and having anti-arthritic activity are generally prepared via ring closure of a β-(thiocarbamoylthio) substituted carboxylic acid with acetic anhydride/concentrated sulfuric acid.

---

This invention relates to novel 3-heteroaryl-2-thio-1,3-thiazane-2,4-diones having useful pharmacodynamic activity. More specifically the compounds of this invention have anti-arthritic activity as measured by their ability to inhibit or suppress adjuvant-induced polyarthriits in rats. Thus the compounds of this invention decrease the inflammed hind leg volumes in experimental rats when compared to controls at oral doses of from 25 to 100 mg./kg./day.

The compounds of this invention are represented by the following structural formula:

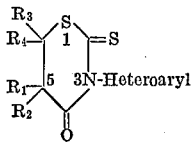

FORMULA I wherein:

$R_1$, $R_2$ and $R_3$ each represent hydrogen, methyl or phenyl, preferably hydrogen;

$R_4$ represents hydrogen or methyl, preferably hydrogen; and

Heteroaryl represents a 5- or 6-membered heterocyclic aromatic ring having 1, 2 or 3 hetero atoms, such as oxygen, sulfur or nitrogen, attached to the thiazane nitrogen via a carbon atom, for example 2-, 3- or 4-pyridyl, 6-methyl-2-pyridyl, 5-chloro-2-pyridyl, 2- or 5-thiazolyl, 2- or 3-thienyl, 2- or 3-furyl, 3- or 4-pyridazinyl, 4- or 5-(1,2,3-thiadiazolyl), 5-(1,2,4-thiadiazolyl), 3-(1,2,5-thiadiazolyl), 2-(1,3,4-thiadozalyl), 2-, or 4- or 5-pyrimidyl, 3- or 5-as-triazinyl or 2-s-triazinyl.

The compounds of Formula I above are prepared by one of the following synthetic methods. An isothiocyanate of the formula heteroaryl—N=C=S is condensed with a β-mercapto substituted carboxylic acid of the formula

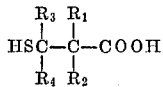

in aqueous trimethylamine solution at room temperature to give a β-(thiocarbamoylthio) substituted acid of the formula

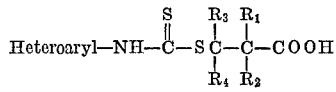

which is converted to the desired thiazane product by heating on a steam bath with acetic anhydride containing a few drops of concentrated sulfuric acid. The isothiocyanate starting materials are prepared, for example, by the reaction of the required heteroaryl amine with thiophosgene either in aqueous solution or in an organic solvent.

Alternatively, starting with a dithiocarbamate, a compound of the formula

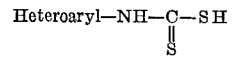

preferably as a triethylamine salt, is condensed with β-propiolactone to give a β-(thiocarbamoylthio)-propionic acid which is converted to the desired thiazane product as described above. The dithiocarbamate starting materials are prepared, for example, by the reaction of the required heteroaryl amine with carbon disulfide, preferably in the presence of triethylamine, at room temperature.

The compounds of this invention are administered in conventional dosage unit forms by incorporating an amount sufficient to produce anti-arthritic activity with a nontoxic pharmaceutical carrier according to accepted procedures. Preferably the dosage units will contain a compound of Formula I in an amount of from about 25 mg. to about 400 mg. per unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrups, peanut oil, olive oil, water and the like. Similarly the carrier or diluent includes any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lonzenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The method of producing anti-arthritic activity in accordance with this invention comprises administering internally to an animal organism a compound of Formula I above, usually combined with a pharmaceutical carrier, in an amount sufficient to produce anti-arthritic activity without limiting side effects. The active medicament will be administered in a dosage unit, as described above, orally or parenterally, the oral route being preferred. Advantageously equal doses will be administered one or two times daily with the daily dosage regimen being from about 25 mg. to about 800 mg. When the method described above is carried out, anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of this invention and their incorporation into pharmaceutical compositions, and as such are not to be considered as limiting the invention set forth in the claims appended hereto.

EXAMPLE 1

A mixture of 18.8 g. of 2-aminopyridine, 12 ml. of carbon disulfide and 30 ml. of triethylamine is warmed to give a clear solution and shaken at room temperature for one and one-half hours. The solid is treated with ether to give triethylammonium N-(2-pyridyl)-dithiocarbamate (Knott, J. Chem. Soc. 1956, 1644–9).

To a suspension of 86.6 g. (0.32 m.) of the above prepared triethylammonium salt in water is added 24.0 g. (0.34 m.) of β-propiolactone, with stirring at room temperature. The reaction mixture is stirred until homogeneous and then made acidic with glacial acetic acid. The resulting product is recrystallized from 50% aqueous acetic acid to give β-[N-(2-pyridyl)-thiocarbamoylthio]-propionic acid, M.P. 159–162° C.

A mixture of 19.5 g. (0.0806 m.) of the above propionic acid, 300 ml. of acetic anhydride and 3–4 drops of concentrated sulfuric acid is heated on a steam bath until the reaction mixture is homogeneous. The volume is reduced to one-third and the solution is colored to give 3-(2-pyridyl)-2-thio-1,3-thiazane-2,4-dione, M.P. 149–151° C.

Similarly the triethylammonium salts of N-(3-pyridyl)-dithiocarbamate, N-(4-pyridyl)-dithiocarbamate, N-(6-methyl-2-pyridyl)-dithiocarbamate and N-(5-chloro-2-pyridyl)-dithiocarbamate are reacted with β-propiolactone as described above followed by treatment of the resulting propionic acids with acetic anhydride to give 3-(3-pyridyl)-2-thio-1,3-thiazane-2,4-dione, 3-(4-pyridyl)-2-thio-1,3-thiazane-2,4-dione, 3-(6-methyl-2-pyridyl)-2-thio-1,3-thiazane-2,4-dione and 3-(5-chloro-2-pyridyl)-2-thio-1,3-thiazane-2,4-dione, respectively.

EXAMPLE 2

To a suspension of 88 g. (0.32 m.) of triethylammonium N-(2-thiazolyl)-dithiocarbamate in water is added 24.0 g. (0.34 m.) of β-propiolactone, with stirring at room temperature. Stirring is continued until the reaction mixture is homogeneous and it is then made acidic with glacial acetic acid to yield the product β-[N-(2-thiazolyl)-thiocarbamoylthio]-propionic acid, M.P. 185–187° C.

A mixture of 20 g. (0.0806 m.) of the above propionic acid, 300 ml. of acetic anhydride and 3–4 drops of concentrated sulfuric acid is heated on a steam bath until the reaction mixture is a homogeneous solution. The latter is reduced to one-third volume and cooled to give 3-(2-thiazolyl)-2-thio-1,3-thiazane-2,4-dione, M.P. 153–155° C.

EXAMPLE 3

Following the procedure of Example 1, triethylammonium N-(2-thienyl)-dithiocarbamate (obtained from 2-aminothiophene, carbon disulfide and triethylamine) is reacted with β-propiolactone in water to give β-[N-(2-thienyl)-thiocarbamoylthio]-propionic acid which is then similarly treated with acetic anhydride/concentrated sulfuric acid to yield 3-(2-thienyl)-2-thio-1,3-thiazane-2,4-dione.

Similarly, by employing triethylammonium N-(2-furyl)-dithiocarbamate as the reactant and proceeding as above there is obtained 3-(2-furyl)-2-thio-1,3-thiazane-2,4-dione.

EXAMPLE 4

To a mixture of 13.7 g. (0.1 m.) of 2-pyrimidylisothiocyanate (obtained from 2-aminopyrimidine and thiophosgene) and 10.6 g. (0.1 m.) of β-mercaptopropionic acid is added 100 ml. of 25% aqueous trimethylamine with stirring. Stirring is continued at room temperature for 30 minutes until the reaction mixture becomes homogeneous and then it is made acidic with concentrated hydrochloric acid to give β-[N-(2-pyrimidyl)-thiocarbamoylthio]-propionic acid.

A mixture of 19.5 g. (0.08 m.) of the above propionic acid, 300 ml. of acetic anhydride and 3–4 drops of concentrated sulfuric acid is heated on a steam bath until homogeneous. The reaction mixture is reduced in volume to one-third and cooled to yield 3-(2-pyrimidyl)-2-thio-1,3-thiazane-2,4-dione.

Similarly, by utilizing 3-pyridazinylisothiocyanate as the initial reactant as described above there is ultimately produced 3-(3-pyridazinyl)-2-thio-1,3-thiazane-2,4-dione.

EXAMPLE 5

By following the procedures outlined in Example 1, triethylammonium N-[2-(1,3,4-thiadiazolyl)]-dithiocarbamate is reacted with β-propiolactone in water to give the propionic acid derivative which is heated with acetic anhydride/concentrated sulfuric acid to yield 3-[2-(1,3,4-thiadiazolyl)]-2-thio-1,3-thiazane-2,4-dione.

Similarly, by employing triethylammonium N-(2-s-triazinyl)-dithiocarbamate as the initial reactant as described above there is obtained as the final product 3-(2-s-trazinyl)-2-thio-1,3-thiazane-2,4-dione.

EXAMPLE 6

To a mixture of 13.6 g. (0.1 m.) of 2-pyridylisothiocyanate (obtained from 2-aminopyridine and thiophosgene) and 13.4 g. (0.1 m.) of 3-mercapto-2,2-dimethylpropionic acid is added 100 ml. of 25% aqueous trimethylamine with stirring. Stirring is continued at room temperature until the reaction mixture is homogeneous and then it is made acidic with concentrated hydrochloric acid to give 3-[N-(2-pyridyl)-thiocarbamoylthio]-2,2-dimethylpropionic acid.

A mixture of 21.6 g. (0.08 m.) of the above propionic acid, 300 ml. of acetic anhydride and 3–4 drops of concentrated sulfuric acid is heated on a steam bath until homogeneous. The reaction mixture is reduced in volume to one-third and cooled to give 3-(2-pyridyl)-5,5-dimethyl-2-thio-1,3-thiazane-2,4-dione.

Similarly, by employing 3-mercapto-2-methylpropionic acid or 3-mercapto-3-methylbutyric acid as the reactants as described above there are obtained the corresponding products, 3-(2-pyridyl)-5-methyl-2-thio-1,3-thiazane-2,4-dione and 3-(2-pyridyl)-6,6-dimethyl-2-thio-1,3-thiazane-2,4-dione, respectively.

EXAMPLE 7

Following the procedures of Example 6, 2-thiazolylisocyanate (obtained from 2-aminothiazole and thiophosgene) is reacted with 3-mercapto-2,2-diphenylpropionic acid in aqueous trimethylamine to yield 3-[N-(2-thiazolyl)-thiocarbamoylthio]-2,2-diphenylpropionic acid. The latter, with acetic anhydride/concentrated sulfuric acid, is converted to the product 3-(2-thiazolyl)-5,5-diphenyl-2-thio-1,3-thiazane-2,4-dione.

Similarly, reaction of 3-mercapto-2-phenylpropionic acid with 2-thiazolylisocyanate as described above gives the corresponding propionic acid derivative which furnishes upon treatment with acetic anhydride/concentrated sulfuric acid the product 3-(2-thiazolyl)-5-phenyl-2-thio-1,3-thiazane-2,4-dione.

EXAMPLE 8

Following the procedures of Example 6, 2-pyridylisocyanate is reacted with 3-mercaptobutyric acid (Berichte Chem. 74, 1758) in 25% aqueous trimethylamine to yield 3-[N-(2-pyridyl)-thiocarbamoylthio]-butyric acid. The latter, with acetic anhydride and 3–4 drops of concentrated sulfuric acid, is heated on the steam bath until homogeneous to give upon work-up, 3-(2-pyridyl)-6-methyl-2-thio-1,3-thiazane-2,4-dione.

Similarly, reaction of β-mercaptohydrocinnamic acid with 2-pyridylisocyanate as described above gives the corresponding β-[N-(2-pyridyl)-thiocarbamoylthio]-hydrocinnamic acid which upon treatment with acetic anhydride/concentrated sulfuric acid results in the formation of the product 3-(2-pyridyl)-6-phenyl-2-thio-1,3-thiazane-2,4-dione.

EXAMPLE 9

| Ingredients: | Mg./tablet |
|---|---|
| 3-(2-pyridyl)-2-thio-1,3-thiazane-2,4-dione | 50 |
| Calcium sulfate, dihydrate | 150 |
| Sucrose | 25 |
| Starch | 15 |
| Talc | 5 |
| Stearic acid | 3 |

The sucrose, calcium sulfate and thiazanedione are thoroughly mixed and granulated with hot 10% gelatin solution. The wetted mass is passed through a #6 mesh screen directly onto drying trays. The granules are dried at 120° F. and passed through a #20 mesh screen, mixed with the starch, talc and stearic acid and compressed into tablets.

EXAMPLE 10

Ingredients: Mg./capsule
3-(2-thiazolyl)-2-thio-1,3-thiazane-2,4-dione -- 100
Magnesium stearate ---------------------- 5
Lactose ---------------------------- 350

The above ingredients are screened through a #40 mesh screen, mixed and filled into #0 hard gelatin capsules.

What is claimed is:
1. A chemical compound of the formula:

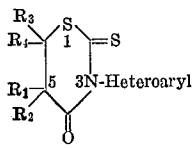

wherein:
$R_1$, $R_2$ and $R_3$ are each hydrogen, methyl or phenyl;
$R_4$ is hydrogen or methyl; and
Heteroaryl is pyridyl, thiazolyl, thienyl, furyl, pyridazinyl, thiadiazolyl, pyrimidyl or tirazinyl, said heteroaryl being attached to the thiazane nitrogen via a carbon atom.

2. A compound according to claim 1 in which $R_1$, $R_2$, $R_3$ and $R_4$ are hydrogen.

3. A compound according to claim 2 in which heteroaryl is 2-pyridyl.

4. A compound according to claim 2 in which heteroaryl is 2-thiazolyl.

References Cited

UNITED STATES PATENTS 2,709,706    5/1955    Jansen ----------- 260—243 X

JOHN M. FORD, Primary Examiner

U.S. Cl. X.R.

424—246